(12) United States Patent
Chae et al.

(10) Patent No.: US 11,912,915 B2
(45) Date of Patent: Feb. 27, 2024

(54) PHOSPHINE PRECURSOR FOR PREPARING QUANTUM DOT AND QUANTUM DOT PREPARED THEREFROM

(71) Applicant: SK CHEMICALS CO., LTD., Gyeonggi-do (KR)

(72) Inventors: Hee Il Chae, Seoul (KR); Jeong Ho Park, Seoul (KR); Kyung Sil Yoon, Gyeonggi-do (KR); Ju-Sik Kang, Gyeonggi-do (KR); Yu Mi Chang, Gyeonggi-do (KR); Nam-Choul Yang, Seoul (KR); Jae Kyun Park, Seoul (KR); Song Lee, Seoul (KR)

(73) Assignee: SK Chemicals Co., Ltd., Gyeonggi-do (KR)

( * ) Notice: Subject to any disclaimer, the term of this patent is extended or adjusted under 35 U.S.C. 154(b) by 706 days.

(21) Appl. No.: 16/489,412

(22) PCT Filed: Mar. 2, 2018

(86) PCT No.: PCT/KR2018/002543
§ 371 (c)(1),
(2) Date: Aug. 28, 2019

(87) PCT Pub. No.: WO2018/160037
PCT Pub. Date: Sep. 7, 2018

(65) Prior Publication Data
US 2020/0071608 A1 Mar. 5, 2020

(30) Foreign Application Priority Data
Mar. 3, 2017 (KR) .................. 10-2017-0027887

(51) Int. Cl.
| | |
|---|---|
| C09K 11/06 | (2006.01) |
| C07F 19/00 | (2006.01) |
| C09K 11/70 | (2006.01) |
| C07F 9/06 | (2006.01) |
| B82Y 20/00 | (2011.01) |
| B82Y 40/00 | (2011.01) |

(52) U.S. Cl.
CPC ............ *C09K 11/06* (2013.01); *C07F 9/06* (2013.01); *C07F 19/00* (2013.01); *C09K 11/70* (2013.01); *B82Y 20/00* (2013.01); *B82Y 40/00* (2013.01); *C09K 2211/1014* (2013.01); *C09K 2211/188* (2013.01)

(58) Field of Classification Search
CPC .................................................... C09K 11/06
See application file for complete search history.

(56) References Cited

U.S. PATENT DOCUMENTS 10,934,316 B2 * 3/2021 Takubo .................. C07F 9/062

FOREIGN PATENT DOCUMENTS

| JP | 2015-104691 | 6/2015 |
|---|---|---|
| JP | 2016-177220 | 10/2016 |
| KR | 10-2010-0067769 | 6/2010 |
| KR | 10-1043311 | 6/2011 |
| KR | 10-2013-0080333 | 7/2013 |
| KR | 10-2016-0059327 | 5/2016 |

OTHER PUBLICATIONS

Parshall et al., "Synthesis of Alkylsilylphospines", Jour. Amer. Chem. Soc., vol. 81, Issue 23, Dec. 5, 1959, pp. 6273-6275.*
Brandt et al, "Silylphosphine Reagents in Synthectic Routes fro Cyclophosphines", Inorg. Chem., vol. 36, #8, 1997, pp. 1728-1731.*
Schubert et al, "Comparative Reactivity of the (Trimethylsilyl) Phosphines (Ms3Si)3-nPHn (n=1,2) in Radical Reactions", Inorg. Chem. vol. 35, #21, 1996, pp. 6204-6209.*
Kapitein et al, "Cyclic NHC-stabilized Silylphosphinoalanes and -gallanes", Dalton Transactions, 45, 2016, pp. 6275-6281, Dec. 22, 2015.*
Gary Chem. Mater. 2013, 25, 2463-2469.*
Westerhausen, Chm. Ber. 1996, 129, 1035-1040.*
Chen, Nat Mater. May 2013 ; 12(5): 445-451.*
Scherer, Journal of Organometallic Chemistry (1972), 40(2), C64-C66.*
Fritz, Zeitschrift fuer Anorganische und Allgemeine Chemie, (1989), 575, 39-54.*
Rotter, Heteroatom Chemistry (2005), 16(5), 420-425.*
Becker et al. "Acyl- und Alkylidenphosphane. XII [1]. Synthese und Eigenschaften des 2,2-Dimethylpropionylphosphans und einiger Derivate," Zeitschrift für anorganische und allgemeine Chemie, Feb. 1981, vol. 473, No. 2, pp. 7-19 (English abstract).
Demuth et al. "Darstellung und charakterisierung von (CF3)2PPH2 und (CF3)2AsPH2," Jounral of Fluorine Chemistry, Jan. 1973, vol. 2, No. 3, pp. 269-279 (English summary).
Driess et al. "Modular Chemistry with Aluminum Phosphanides: Cluster Formation of (AIP)n (n=3,6,7), Al4P3, and Al4Li4P6 Frameworks," Chemistry A European Journal, 2000, vol. 6, No. 23, pp. 4343-4347.
Fritz et al. "Über den Einfluß der Substituenten im (R3Si)2(P—Si)R2CI auf Bildung und Eigenschaften der Hexasilatetraphosphadantane und deren 31P-NMR-Spektren," Zeitschrift für anorganische und allgemeine Chemie, Aug. 1989, vol. 575, No. 1, pp. 39-54 (English abstract).
Von Hanisch et al. "Synthesis and Characterisation of Molecular Bismuth Phosphorus Compounds Containing Bi2 Units with Bi—Bi Single and Double Bonds," European Journal of Inorganic Chemistry, 2006, vol. 2006, No. 23, pp. 4770-4773.
Westerhausen et al. "NMR-spektroskopische und strukturelle Charakterisierung der Tri-iso-propylsilylphosphanide des Calciums," Journal of Organometallic Chemistry, 1996, vol. 513, pp. 213-229 (English abstract).

(Continued)

*Primary Examiner* — Nizal S Chandrakumar
(74) *Attorney, Agent, or Firm* — Sheridan Ross P.C.

(57) ABSTRACT

The present invention relates to a phosphine precursor for the preparation of a quantum dot, and a quantum dot prepared therefrom. Using the phosphine precursor for the preparation of a quantum dot of the present invention, a quantum dot with improved luminous efficiency and higher luminous color purity can be provided.

4 Claims, 1 Drawing Sheet

(56) References Cited

OTHER PUBLICATIONS

Official Action with English Translation for Japan Patent Application No. 2019-548069, dated Oct. 21, 2021, 10 pages.
Allen et al. "Mechanistic Insights into the Formation of InP Quantum Dots," Angew Chem Int Ed Engl., 2010, vol. 49, No. 4, pp. 760-762.
Bender et al. "Synthese amino- und silylsubstituierter Triphosphane—Struktur des 1.1.3.3-Tetrakis(di-iso-propylamino)-2-trimethylsilyl- und des 1.1.3.3-Tetraphenyl-2-tri-iso-propylsilyl-triphosphans," Verlag der Zeitschrift fur Natruforschung, 2013, pp. 1742-1752.
Cappello et al. "Monophosphanes and Diphosphanes with the Hypersilyl Substituent," European Journal of Inorganic Chemistry, 2006, pp. 4589-4599.
COSSAIRT "Shining Light on Indium Phosphide Quantum Dots: Understanding the Interplay among Precursor Conversion, Nucleation, and Growth," Chemistry of Materials, 2016, vol. 28, pp. 7181-7189.
Gary et al. "Investigation of Indium Phosphide Quantum Dot Nucleation and Growth Utilizing Triarylsilylphosphine Precursors," Chemistry of Materials, 2014, vol. 26, pp. 1734-1744.
Gary et al. "Two-Step Nucleation and Growth of InP Quantum Dots via Magic-Sized Cluster Intermediates," Chemistry of Materials, 2015, vol. 27, pp. 1432-1441.
Gary et al. "Role of Acid in Precursor Conversion During InP Quantum Dot Synthesis," Chemistry of Materials, 2013, vol. 25, No. 12, pp. 2463-2469.
Harris et al. "Improved Precursor Chemistry for the Synthesis of III-V Quantum Dots," Journal of the American Chemical Society, 2012, vol. 134, pp. 20211-20213.

Scherer et al. "Inversionsbarriere eines Trissilylphosphins," Journal of Organometallic Chemistry, 1972, vol. 40, pp. C64-C66.
Uhlig et al. "Eine neue Methode zur Darstellung von Organosilylphosphinen," Zeitschrift fur Anorganische Chemie, 1989, vol. 576, pp. 281-283.
Westerhausen et al. "Synthesis and Dynamic Behavior of the Dimeric, Monocyclic Barium Bis[bis(isopropyldimethylsilyl)phosphanide]—Molecular Structures of P(SiMe2Ph)3, of Monomeric (thf)4Ba[P(SiMe2iPr)2]2 and of the Dimer {(thf)2Ba[P(SiMe2iPr]2]2}2," Chemische Berichte, Sep. 1996, vol. 129, No. 9, pp. 1035-1040.
Westermann et al. "Synthesis and structural characterization of tetrakis (tert-butyldimethylsilyl)-diphosphine," Inorganica Chimica Acta, 1990, vol. 177, pp. 11-12.
International Search Report for International (PCT) Patent Application No. PCT/KR2018/002543, dated Jun. 15, 2018, 3 pages.
Fritz et al. "Monolithinierte Silylphosphane," Zeitschrift für anorganische und allgemeine Chemie, 1976, vol. 422, pp. 104-114 (English abstract).
Hassler "Synthese und Kernresonanzspektren von Methylphenyl-substituierten Trisilylphosphanen PSi3MenPh9-n," Monatshefte Fur Chemi, Jan. 1988, vol. 119, No. 22, pp. 851-862 (English abstract).
Petrie et al. "Synthesis and Characterization of the Monomeric Phosphinogallanes But2GaPR'R" (R',R" = buldky aryl or silyl groups) and Related Compounds," Journal of the Chemical Society, Dalton Transactions, 1993, pp. 1737-1745.
Joung et al. "Facile synthesis of uniform large-sized InP nanocrystal quantum dots using tris(tert-butyldimethylsilyl)phosphine," Nanoscale Research Letters, 2012, vol. 7, article 93, 8 pages.

* cited by examiner

PHOSPHINE PRECURSOR FOR PREPARING QUANTUM DOT AND QUANTUM DOT PREPARED THEREFROM

CROSS-REFERENCE TO RELATED APPLICATION

This application is a national stage application under 35 U.S.C. 371 and claims the benefit of PCT Application No. PCT/KR2018/002543 having an international filing date of 2 Mar. 2018, which designated the United States, which PCT application claimed the benefit of Korean Patent Application No. 10-2017-0027887 filed on Mar. 3, 2017 with the Korean Intellectual Property Office, the disclosures of which are herein incorporated by reference in their entirety.

BACKGROUND OF THE INVENTION

(a) Field of the Invention

CROSS-REFERENCE TO RELATED APPLICATION

This application claims the benefit of Korean Patent Application No. 10-2017-0027887 filed on Mar. 3, 2017 with the Korean Intellectual Property Office, the disclosures of which are herein incorporated by reference in their entirety.

The present invention relates to a phosphine precursor for the preparation of a quantum dot, and quantum dot prepared therefrom.

(b) Description of the Related Art

A nanocrystal referred to as a quantum dot (QD) is a material having a crystal structure of several nano to several tens of nano size, consists of hundreds to thousands of atoms, and has unique electrical, magnetic, optical, chemical and mechanical properties different from the unique properties of the original material itself, according to the unique crystal structure and particle size. And, by controlling the size of the nanocrystal, the above described properties can be controlled. Due to such properties, quantum dots are receiving great attention because they are highly likely to be applied for various devices such as next generation light emitting diodes (LED), organic/inorganic hybrid electroluminescent devices, inorganic electroluminescent devices, solar cells, transistors, etc.

In order to secure excellent emission spectrum, a quantum dot is required to have high luminous efficiency and excellent color purity, wherein the color purity is evaluated as being excellent as full width at half maximum (FWHM) is narrower, and as the crystal size of a quantum dot is more uniform, namely, a quantum dot has a crystal of more uniform size, narrower full width at half maximum is exhibited.

A quantum dot is receiving attention due to high luminous efficiency and color reproducibility compared to the existing light emitting material, and among them, quantum dots using Group II-VI compounds of the periodic table have high luminous efficiency and luminous region, and thus, a lot of studies are being progressed thereon.

An InP quantum dot is a representative Group II-V quantum dot having a broad luminous region from visible ray to near infrared ray. However, in general, the InP quantum dot has somewhat low luminous efficiency and comparatively low color purity, compared to a CdSe-based quantum dot, and thus, a lot of studies for preparing an InP quantum dot having improved luminous efficiency have been progressed.

The InP quantum dot is prepared by reacting a phosphorus precursor with an indium precursor, and as the phosphorus precursor, a phosphine compound, TMSP (tris(trimethylsilyl)phosphine), is generally used.

However, since TMSP has a high risk of explosion and contains lethal toxicity, and the InP quantum dot prepared from TMSP by known methods cannot be considered as exhibiting sufficiently competitive color purity, there is a demand for the development of a phosphorus precursor that can prepare a quantum dot having narrower full width at half maximum instead of TMSP, and has secured process stability.

Korean Registered Patent No. 1043311 disclosed a method for preparing an InP quantum dot using tris(dimethyl tert-butyl)silyl phosphine ($P(SiMe_2\text{-tert-Bu})_3$) as a phosphorus precursor instead of TMSP.

However, since the tris(dimethyl tert-butyl)silyl phosphine, similarly to TMSP, has a tertiary phosphine structure wherein three identical ligands (dimethyl tert-butyl silyl group) are introduced in the central atom phosphorus (P), and does not have the effect of decreasing full width at half maximum compared to the quantum dot prepared using TMSP, it is not sufficient to replace TMSP, and there is a demand for a precursor capable of preparing a quantum dot with higher color purity.

SUMMARY OF THE INVENTION

It is an object of the present invention to provide a novel phosphine precursor and a quantum dot prepared therefrom, which enables the preparation of a quantum dot having more uniform crystal size, thus, exhibiting high color purity.

In order to solve the above problem, one aspect of the present invention provides a phosphine precursor for the preparation of a quantum dot, represented by the following Chemical Formula 1:

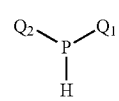

[Chemical Formula 1]

$Q_1$ is hydrogen or

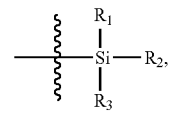

$Q_2$ is hydrogen or

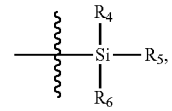

provided that both $Q_1$ and $Q_2$ are not hydrogen, wherein $R_1$ to $R_6$ are identical to or different from each and, each independently, hydrogen, C1-C20 linear or branched alkyl, C6-C30 aryl, C7-C30 alkylaryl, or C7-C30 arylalkyl, provided that all $R_1$ to $R_6$ are not hydrogen.

Another aspect of the present invention provides a method for preparing the phosphine precursor.

Yet another aspect of the present invention provides a precursor composition for the preparation of a quantum dot, comprising the phosphine precursor.

Yet another aspect of the present invention provides a quantum dot prepared from the phosphine precursor.

Yet another aspect of the present invention provides a method for preparing a quantum dot using one or more kinds of the phosphine precursors.

The phosphine precursor for the preparation of a quantum dot according to the present invention, unlike TMSP conventionally used for the preparation of InP quantum dot, comprises two or less silyl ligands, and controls a reaction speed with other precursors by various substituents connected to the silyl ligand, thereby enabling the preparation of a quantum dot having more uniform crystal size.

Thus, using the precursor of the present invention, a quantum dot that has improved luminous efficiency and higher luminous color purity can be provided.

DETAILED DESCRIPTION OF THE EMBODIMENTS

Figure 1:
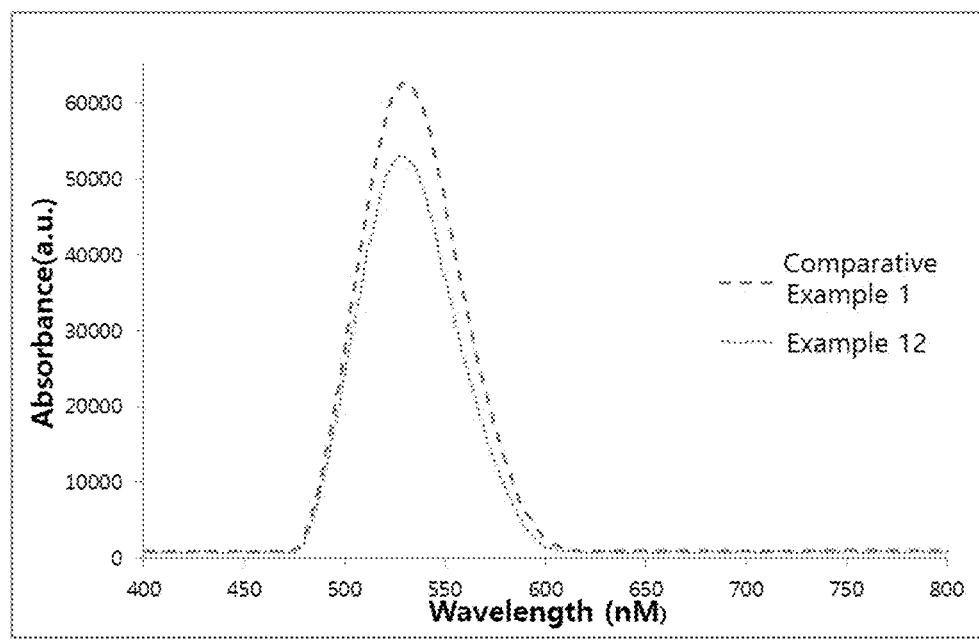
FIG. 1 is a graph showing the emission properties of the quantum dots according to Examples and Comparative Examples.

Although various modifications can be made to the present invention and the present invention may have various forms, specific examples will be illustrated and explained in detail below. However, it should be understood that these are not intended to limit the present invention to specific disclosure, and that the present invention includes all the modifications, equivalents or replacements thereof without departing from the spirit and technical scope of the invention.

Hereinafter, a phosphine precursor for the preparation of a quantum dot, and a quantum dot prepared therefrom according to the present invention will be explained in more detail.

I. A Phosphine Precursor and a Method for Preparing the Same

The phosphine precursor for the preparation of a quantum dot according to one aspect of the present invention is represented by the following Chemical Formula 1:

[Chemical Formula 1]

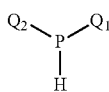

in the Chemical Formula 1, $Q_1$ is hydrogen or

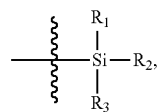

$Q_2$ is hydrogen or

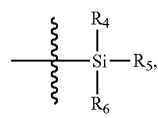

provided that both $Q_1$ and $Q_2$ are not hydrogen, wherein $R_1$ to $R_6$ are identical to or different from each and, each independently, hydrogen, C1-C20 linear or branched alkyl, C6-C30 aryl, C7-C30 alkylaryl, or C7-C30 arylalkyl, provided that all $R_1$ to $R_6$ are not hydrogen.

A nanocrystal referred to as a quantum dot (QD) is a material having a crystal structure of several nano to several tens of nano size, consists of hundreds to thousands of atoms, and has unique electrical, magnetic, optical, chemical and mechanical properties different from the unique properties of the original material itself, according to the unique crystal structure and particle size. And, by controlling the size of the nanocrystal, the above described properties can be controlled.

Even if quantum dots are made of the same materials, the colors of light emitted may vary according to the size of nanocrystal. Due to the property, quantum dots are receiving great attention because they are highly likely to be applied for various devices such as next generation light emitting diodes (LED), organic/inorganic hybrid electroluminescent devices, inorganic electroluminescent devices, solar cells, transistors, etc.

In order to secure excellent emission spectrum, a quantum dot is required to have high luminous efficiency and excellent color purity, wherein the color purity is evaluated as being excellent as full width at half maximum (FWHM) is narrower, and as the crystal size of a quantum dot is more uniform, namely, a quantum dot has a crystal of more uniform size, narrower full width at half maximum is exhibited.

Factors controlling the crystal size of a quantum dot include reaction temperature, reaction time, etc., and one of them is to control the reaction speed between the precursors for the preparation of quantum dots.

Here, it is generally known that as the reactivity of precursors is lower, namely, as the reaction speed is slower, quantum dots having a crystal size of more uniform distribution are produced. However, the present inventors confirmed that as the reactivity of precursors is lower, the uniformity of the size of produced quantum dot is not necessarily proportional thereto, and that quantum dots having various properties that cannot be predicted may be prepared according to the structural characteristics of precursors, and based on the discovery, completed the present invention.

More specifically, the distribution of the crystal size of quantum dots appears to vary according to the structure of each ligand, and organic characteristics as a whole precursor, and is not simply predicted arithmetically.

Thus, the present inventors prepared quantum dots using various phosphine precursors for the preparation of a quantum dot, and evaluated the physical and optical properties of the prepared quantum dots, and as the result, confirmed that a quantum dot having excellent luminous efficiency and color purity can be provided by a phosphine precursor of the following Chemical Formula 1:

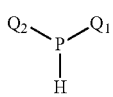

[Chemical Formula 1]

in the Chemical Formula 1,
$Q_1$ is hydrogen or

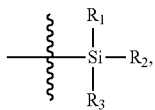

$Q_2$ is hydrogen or

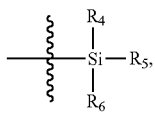

provided that both $Q_1$ and $Q_2$ are not hydrogen,
wherein $R_1$ to $R_6$ are identical to or different from each and, each independently, hydrogen, C1-C20 linear or branched alkyl, C6-C30 aryl, C7-C30 alkylaryl, or C7-C30 arylalkyl, provided that all $R_1$ to $R_6$ are not hydrogen.

The phosphine precursor for the preparation of a quantum dot of the Chemical Formula 1 has the characteristic of primary phosphine or secondary phosphine, and is a compound for novel use, of which use as a precursor for the preparation of a quantum dot has not been known.

That is, one of the ligands of phosphorous (P) is hydrogen, and at least one of the other two ligands ($Q_1$, $Q_2$) is a silyl ligand substituted with various hydrocarbon groups such as alkyl, aryl, alkylaryl or arylalkyl, The bulkiness of the whole precursor is variously controlled according to the kind of the substituents connected to the silyl ligand, and thus, reactivity varies in reactions with other precursors for the preparation of quantum dots.

Namely, the phosphine precursor for the preparation of a quantum dot of the Chemical Formula 1, unlike conventionally known TMSP, does not comprise three ligands of the same structure, but has a ligand structure asymmetric to the central atom phosphorus (P), wherein one ligand is necessarily hydrogen and one or two ligands of the remaining two are silyl groups, and due to such an asymmetric structure, exhibits complex reactivity.

And, the phosphine precursor for the preparation of a quantum dot of the Chemical Formula 1 of the present invention exhibit faster reaction speed than tertiary phosphine TMSP, and thus, enables the preparation of a quantum dot at lower temperature than conventional TMSP.

In the Chemical Formula 1, $Q_1$ and $Q_2$ may be identical to or different from each other, and one of $Q_1$ and $Q_2$ may be hydrogen.

In the Chemical Formula 1, when one of $Q_1$ and $Q_2$ is hydrogen, the phosphine precursor of the Chemical Formula 1 has the characteristics of secondary phosphine, and when neither $Q_1$ nor $Q_2$ is hydrogen, the phosphine precursor of the Chemical Formula 1 has the characteristics of primary phosphine.

In the Chemical Formula 1, preferably, $R_1$ to $R_6$ may be each independently, C1-C6 linear alkyl, C3-C6 branched alkyl, or C6-C12 aryl.

More preferably, $R_1$ to $R_6$ may be each independently, methyl, ethyl, n-propyl, iso-propyl, n-butyl, tert-butyl, iso-butyl, or phenyl.

According to ne embodiment of the present invention, the compound of the Chemical Formula 1 may be a compound represented by the following Chemical Formula 1-1.

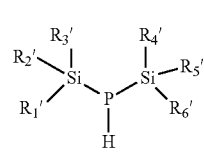

[Chemical Formula 1-1]

In the Chemical Formula 1-1,
$R_1'$ to $R_6'$ are identical to or different from each other, and each independently, hydrogen, C1-C20 linear or branched alkyl, C6-C30 aryl, C7-C30 alkylaryl, or C7-C30 arylalkyl, provided that all $R_1'$ to $R_6'$ are not hydrogen.

In the Chemical Formula 1-1, preferably, $R_1'$ to $R_6'$ may be each independently, linear alkyl, C3-C6 branched alkyl, or C6-C12 aryl.

More preferably, $R_1'$ to $R_6'$ may be each independently, methyl, ethyl, n-propyl, iso-propyl, n-butyl, tert-butyl, iso-butyl, or phenyl.

According to one embodiment of the present invention, the compound of the Chemical Formula 1 may be a compound represented by the following Chemical Formula 1-2.

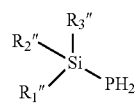

[Chemical Formula 1-2]

In the Chemical Formula 1-2,
$R_1''$ to $R_3''$ are identical to or different from each other, and each independently, hydrogen, C1-C20 linear or branched alkyl, C6-C30 aryl, C7-C30 alkylaryl, or C7-C30 arylalkyl, provided that all $R_1''$ to $R_3''$ are not hydrogen.

In the Chemical Formula 1-2, preferably, $R_1''$ to $R_3''$ may be each independently, linear alkyl, C3-C6 branched alkyl, or C6-C12 aryl.

More preferably, $R_1''$ to $R_3''$ may be each independently, methyl, ethyl, n-propyl, iso-propyl, n-butyl, tert-butyl, iso-butyl, or phenyl.

According to one embodiment of the present invention, the compound of the Chemical Formula 1 may be selected from the group consisting of the following Formulas.

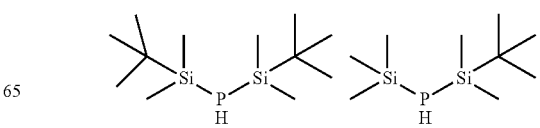

-continued

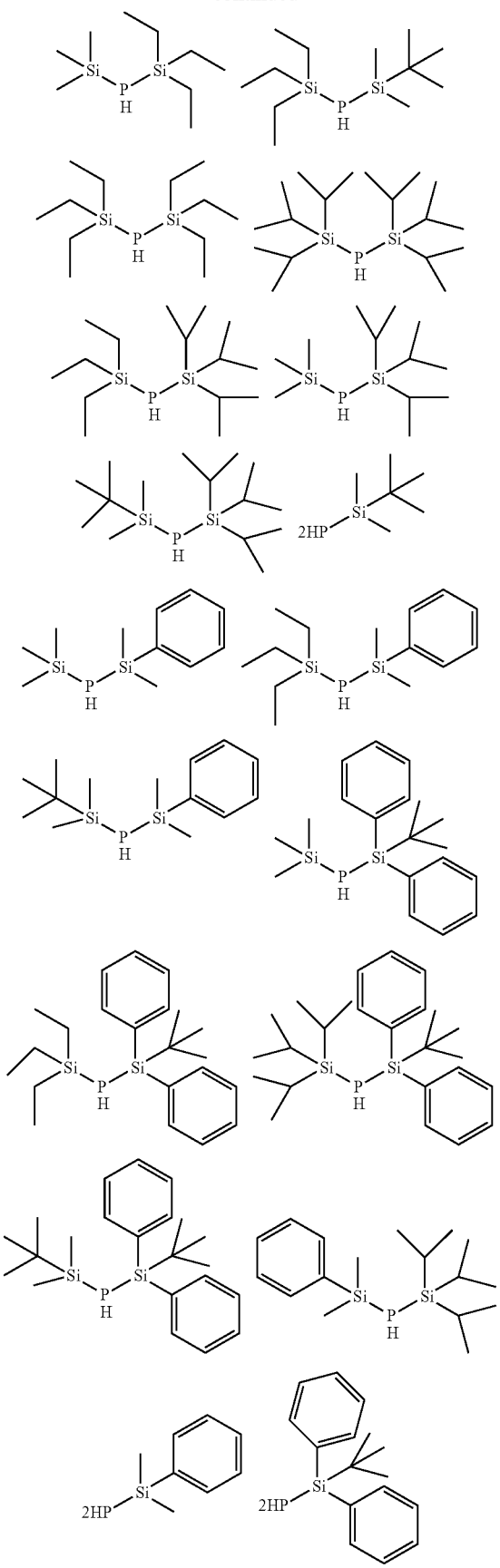

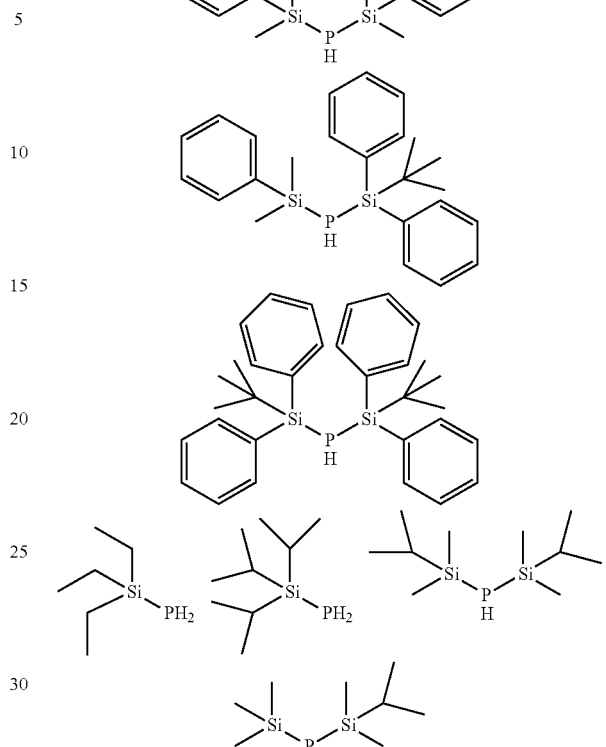

The phosphine precursor for the preparation of a quantum dot of the Chemical Formula 1 may be prepared by reacting a silyl triflate compound and phosphine ($PH_3$), or a silyl triflate compound and a primary phosphine compound.

More specifically, a method for preparing the phosphine precursor for the preparation of a quantum dot of the Chemical Formula 1 according to one embodiment comprise the steps of preparing a mixture of a silyl triflate compound, halogenated hydrocarbon, and tertiary amine; and adding phosphine to the mixture.

The preparation method may be specifically represented by the following Reaction Formula 1:

[Reaction Formula 1]

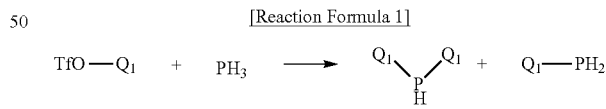

In the Reaction Formula 1, $Q_1$ is as defined in the Chemical Formula 1 (provided that $Q_1$ is not hydrogen), TfO means trifluoromethanesulfonate (triflate).

As shown in the Reaction Formula 1, if the reaction of a silyl triflate and phosphine is conducted, a mixture of a primary phosphine precursor wherein the hydrogen of the phosphine is substituted with one $Q_1$, and a secondary phosphine precursor wherein the hydrogens of the phosphine are substituted with two $Q_1$'s, is obtained, and by fractional distillation, a primary phosphine precursor and a secondary phsophine precursor may be respectively obtained.

A method for preparing the phosphine precursor for the preparation of a quantum dot of the Chemical Formula 1 according to another embodiment comprise the steps of preparing a mixture of a primary phosphine compound, halogenated hydrocarbon, and tertiary amine; and adding a silyl triflate compound to the mixture.

The preparation method may be specifically represented by the following Reaction Formula 2:

[Reaction Formula 2]

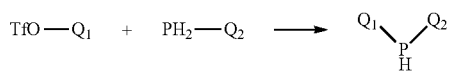

In the Reaction Formula 2, $Q_1$ is as defined in the Chemical Formula 1 (provided that both $Q_1$ and $Q_2$ are not hydrogen), TfO means trifluoromethanesulfonate (triflate).

As shown in the Reaction Formula 2, if the reaction of a silyl triflate and a primary phosphine compound is conducted, the hydrogen of the primary phosphine is substituted with $Q_1$, and thus, a secondary phosphine precursor may be obtained.

Hereinafter, the materials used in the preparation method will be explained in detail.

The halogenated hydrocarbon is commonly polar and is well known as nonflammable material, but is not used as a reaction solvent in a highly reactive reaction using a polar solvent or using a raw material with a fire danger. And, since some hydrogenated halogenated hydrocarbons are decomposed to become acidic and are also used as the oxidant of an oxidation reaction, they are not used in a reaction using highly reactive raw materials. However, in the preparation method of the present invention, it was confirmed that when the halogenated hydrocarbon is used as reaction solvent, mass production process stability is exhibited, and the aimed phosphine precursor compound can be obtained with high yield and high purity, on the contrary.

The halogenated hydrocarbon may be one or more selected from the group consisting of difluoromethane, trifluoromethane, tetrafluoromethane, tetrafluoroethane, pentafluoroethane, hexafluoroethane, dichloromethane, chloroform, carbon tetrachloride, tetrachloroethane, pentachloroethane, hexachloropropane, heptachloropropane, octachloropropane, dibromomethane, tribromomethane, tetrabromomethane, tetrabromoethane, pentabromoethane and hexabromoethane, but is not limited thereto.

The halogenated hydrocarbon does not exhibit reactivity with other raw materials, and is preferably substituted with inexpensive chlorine. Thus, the halogenated hydrocarbon may be one or more selected from the group consisting of dichloromethane, chloroform, carbon tetrachloride, tetrachloroethane, pentachloroethane, hexachloroethane, hexachloropropane, heptachloropropane and octachloropropane, and more preferably, dichloromethane or tetrachloroethane.

The used amount of the halogenated hydrocarbon may be appropriately controlled considering the easiness of handling, reaction stability, reaction yield and product purity.

The tertiary amine may comprise one or more substituents selected from the group consisting of methyl, ethyl, propyl, isopropyl, butyl, isobutyl, t-butyl and phenyl.

The tertiary amine may be selected from the group consisting of trimethylamine, triethylamine, tripropylamine, tributylamine, triphenylamine, dimethylethylamine, methyldiethylamine, dimethylpropylamine, methyldipropylamine, methylethylpropylamine, diethylpropylamine, ethyldipropylamine and ethyldiisopropylamine, and preferably, triethylamine.

The tertiary amine may be used in an amount of 0.5 to 2 molar equivalents, based on 1 mole of the silyl triflate compound.

II. A Precursor Composition for the Preparation of a Quantum Dot

The precursor composition for the preparation of a quantum dot according to another aspect of the present invention comprise the above described phosphine precursor.

The precursor composition for the preparation of a quantum dot comprises the phosphine precursor of the Chemical Formula 1 as explained above. It may comprise only one kind of the phosphine precursor of the Chemical Formula 1, or may comprise two or more kinds of phosphine precursors corresponding to the Chemical Formula 1.

And, according to one embodiment of the present invention, the precursor composition may further comprise tris(trimethylsilyl)phosphine, in addition to the phosphine precursor of the Chemical Formula 1.

In case the precursor composition for the preparation of a quantum dot comprises two or more kinds of the phosphine precursor of the Chemical Formula 1, or further comprises tris(trimethylsilyl)phosphine, the mixing ratio is not specifically limited.

For example, the precursor composition for the preparation of a quantum dot may comprise the phosphine precursor of the Chemical Formula 1 and tris(trimethylsilyl)phosphine at a mole ratio of 1:10 to 10:1, or 1:5 to 5:1, or 1:2 to 2:1.

III. Quantum Dot

According to yet another aspect of the present invention, a quantum dot prepared from the phosphine precursor is provided.

According to yet another aspect of the present invention, a method for preparing quantum dot using one or more phosphine precursors is provided.

The quantum dot prepared using the phosphine precursor of the Chemical Formula 1 has narrower full width at half maximum than the quantum dot conventionally prepared using TMSP as a phosphine precursor, and may exhibit excellent luminous efficiency.

Throughout the specification, the description "quantum dot prepared from the phosphine precursor" means a quantum dot prepared using one or more kinds of the phosphine precursors of the Chemical Formula 1 as explained above as a phosphorus source in any step of the preparation steps of a quantum dot, and is not bound to the size, shape or structure of a quantum dot, etc.

According to one embodiment of the present invention, the quantum dot may be a quantum dot comprising InP.

According to one embodiment of the present invention, the quantum dot may be a quantum dot of a core/shell structure consisting of a core layer and a shell layer. More specifically, the quantum dot may be a quantum dot of a core/shell structure comprising InP as a core, and comprising ZnS and/or GaP as a shell.

The quantum dot may be prepared by the preparation method described below.

For example, the preparation method of a quantum dot according to one embodiment of the present invention comprises the steps of heating a mixture of an indium precursor, a zinc precursor, myristic acid and 1-octadecene; cooling the mixture to a room temperature; introducing one or more phosphine precursors of the present invention as explained above, a gallium precursor and 1-octadecene into the cooled mixture, and heating to react them; and introducing dodecanethiol into the reactant, and cooling.

More specifically, a method for preparing a quantum dot comprising InP as a core and comprising ZnS and GaP as a shell is as follow: first, to a mixture of myristic acid (MA) and 1-octadecene (ODE), an indium precursor and a zinc precursor are added, and the mixture is heated to 100 to 140° C. (step 1).

The mixture of the step 1 is cooled to a room temperature (step 2).

Next, into the mixture of the step 1 cooled to a room temperature, 1-octadecene, a gallium precursor and the above explained phosphine precursor of the Chemical Formula 1 are introduced. The phosphine precursor of the Chemical Formula 1 may be introduced only one kind, or two or more kinds thereof may be mixed and introduced. And, in addition to the phosphine precursor of the Chemical Formula 1, TMSP may be further mixed and used.

The temperature of the mixture is raised to 200 to 320° C., and the mixture is reacted for 1 to 30 minutes (step 3).

To the reactant of the step 3, dodecanethiol (DDT) is introduced, and then, the reactant is cooled to a room temperature (step 4).

The reactant cooled to a room temperature is precipitated, and then, purified to obtain an InP/GaP/ZnS quantum dot.

The quantum dot obtained using the phosphine precursor of the Chemical Formula 1 of the present invention may exhibit uniform crystal size, excellent luminous efficiency and color purity.

For example, the quantum dot obtained using the phosphine precursor of the present invention may exhibit the effect of improving quantum efficiency and/or full width at half maximum about 1 to about 15%, compared to the case of using TMSP alone under the same conditions.

According to one embodiment of the present invention, the quantum dot obtained using the phosphine precursor of the present invention may exhibit full width at half maximum of about 35 to about 60 nm, or about 40 to about 60 nm.

And, the quantum dot obtained using the phosphine precursor of the present invention may have a particle diameter in the range of about 2 to about 5 nm.

The quantum dot obtained using the phosphine precursor of the present invention is expected to be diversely applied for various devices such as light emitting diode (LED), display, organic/inorganic hybrid electroluminescent device, inorganic electroluminescent device, solar cell, transistor, etc.

Hereinafter, the actions and the effects of the present invention will be explained in detail through specific examples. However, these examples are presented only as the illustrations of the invention, and the scope of the right of the invention is not determined thereby.

EXAMPLE

All the following Examples and Comparative Examples were progressed under an inert environment. The analysis was conducted using NMR analyzer at 600 MHz under benzene anhydrous-$D_6$ solvent, and using GC-MS under an inert environment. For all the solvents used for the reaction and analysis, moisture was removed using a molecular sieve before use.

Preparation Example of a Phosphine Precursor

Example 1: Synthesis of bis(tert-butyldimethyl silyl)phosphine, $(t-BuMe_2Si)_2PH$

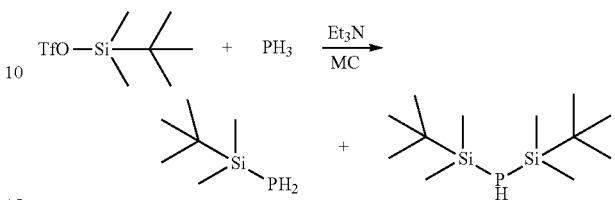

In a 2 L round-bottom three-neck flask of nitrogen atmosphere, at room temperature, 100 g of tert-butyldimethyl silyl triflate and 61 g of triethyl amine were added to 1 L of dichloromethane, and the mixture was stirred and mixed. While maintaining the temperature of the mixture at 25° C. or less, phosphine ($PH_3$) gas was introduced through a cannula at a speed of 3 ml/minute. When total 17 g of phosphine was introduced, the introduction of phosphine was stopped. The reactant thus obtained in the form of a mixture was vacuum distilled without filtration, thus obtaining 52.4 g of the title compound, bis(tert-butyldimethyl silyl)phosphine (yield: 50%).

MS (ESI): $[M+H]^+$ 262

$^1$H NMR (600 MHz, benzene-$d_6$): δ 0.92 (s, 18H), 0.14 (d, 12H)

$^{31}$P NMR (243 MHz, benzene-$d_6$): δ −262.2 (s)

Example 2: Synthesis of tert-butyldimethyl silyl)phosphine, $(t-BuMe_2Si)PH_2$

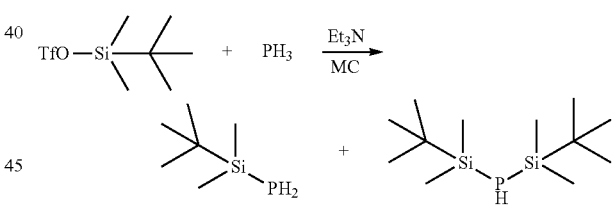

A reactant in the form of a mixture was obtained using the same reagents and method as Example 1, and vacuum distilled to obtain 10.2 g of the title compound (tert-butyldimethyl silyl)phosphine) (yield: 17%).

MS (ESI): $[M+H]^+$ 148

$^1$H NMR (600 MHz, benzene-$d_6$): δ 0.92 (s, 18H), 0.14 (d, 12H)

$^{31}$P NMR (243 MHz, benzene-$d_6$): δ −241.5 (s)

Example 3: Synthesis of bis(dimethylphenyl silyl)phosphine, $(PhMe_2Si)_2PH$

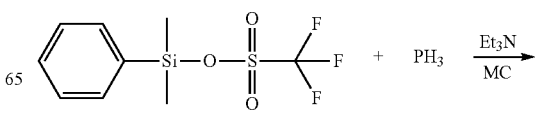

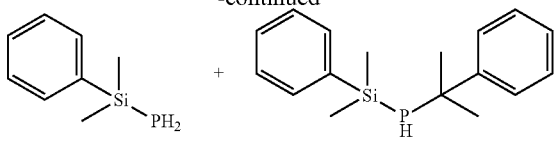

42.4 g (yield: 35%) of bis(dimethylphenyl silyl)phosphine was obtained by the same method as Example 1, except using dimethylphenyl silyl triflate instead of tert-butyldimethyl silyl triflate.

MS (ESI): [M+H]+ 302
$^1$H NMR (600 MHz, benzene-$d_6$): δ 0.29 (s, 12H), 6.99-6.53 (m, 10H)
$^{31}$P NMR (243 MHz, benzene-$d_6$): δ −237.4 (s)

Example 4: Synthesis of (tert-butyldimethyl silyl)(trimethyl silyl)phosphine, (t-BuMe$_2$Si)(Me$_3$Si)PH

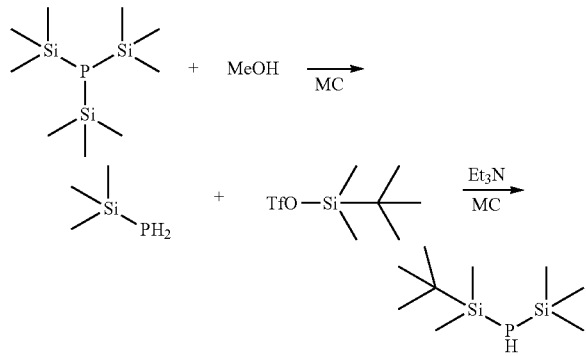

Step 1: Preparation of tris(trimethylsilyl)phosphine

In a 2 L round-bottom three-neck flask of nitrogen atmosphere, at room temperature, 90 ml of trimethylsilyl triflate and 104 ml of triethyl amine were added to 1 L of dichloromethane, and the mixture was stirred and mixed. The mixture was cooled to a temperature of 10° C. or less, and then, phosphine gas was introduced through a cannula at a speed of 10 ml/minute. When total 9 g of phosphine was introduced, the introduction of phosphine was stopped. The obtained liquid reactant was vacuum distilled without filtration, thus obtaining 50.5 g of tris(trimethylsilyl)phosphine (yield: 92%).

Step 2: Preparation of trimethylsilylphosphine

In a 2 L round-bottom three-neck flask of nitrogen atmosphere, 30 g of the above prepared tris(trimethylsilyl)phosphine was added to 500 ml of dichloromethane, and the mixture was cooled to 0° C. While maintaining 0° C., 7.6 g of methanol was added dropwise for 1 hour. The produced trimethylsilyl phosphine was used for the next step without a separate process of concentration or purification.

Step 3: Preparation of (tert-butyldimethyl silyl)(trimethylsilyl)

The mixture of trimethylsilylphosphine in dichloromethane prepared in the step 2 was cooled to 0° C., and then, 12.1 g of triethyl amine and 32.7 g of tert-butyldimethyl silyl triflate were added dropwise for 1 hour. The obtained reactant was vacuum distilled without filtration, thus obtaining 5.2 g of (tert-butyldimethyl silyl)(trimethyl silyl)phosphine (yield: 20%).

MS (ESI): [M+H]+ 220.4
$^1$H NMR (600 MHz, benzene-$d_6$): δ 0.90 (s, 9H), 0.19 (d, 9H), 0.14 (d, 6H)
$^{31}$P NMR (243 MHz, benzene-$d_6$): δ −248.1 (s)

Example 5: Synthesis of bis(triethylsilyl)phosphine, (Et$_3$Si)$_2$PH

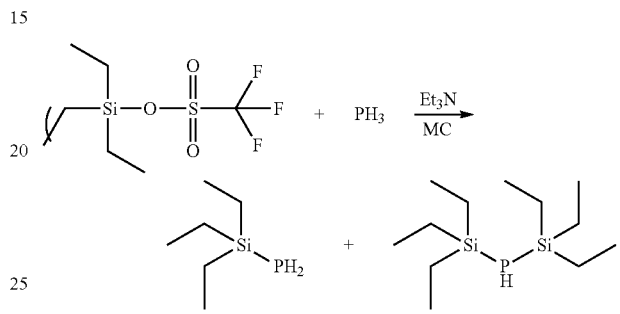

In a 2 L round-bottom three-neck flask of nitrogen atmosphere, at room temperature, 100 g of triethylsilyl triflate and 46 g of triethyl amine were added to 1 L of dichloromethane, and the mixture was stirred and mixed. While maintaining the temperature of the mixture at 25° C. or less, phosphine (PH$_3$) gas was introduced through a cannula at a speed of 3 ml/minute. When total 6.5 g of phosphine was introduced, the introduction of phosphine was stopped. The reactant thus obtained in the form of a mixture was vacuum distilled without filtration, thus obtaining 32.2 g of the title compound, bis(triethylsilyl)phosphine (yield: 65%).

MS (ESI): [M+H]+ 262
$^1$H NMR (600 MHz, benzene-$d_6$): δ 0.95 (t, 18H), 0.65 (m, 12H)
$^{31}$P NMR (243 MHz, benzene-$d_6$): δ −276.5 (s)

Example 6: Synthesis of triethylsilylphosphine, (Ee$_3$Si)PH$_2$

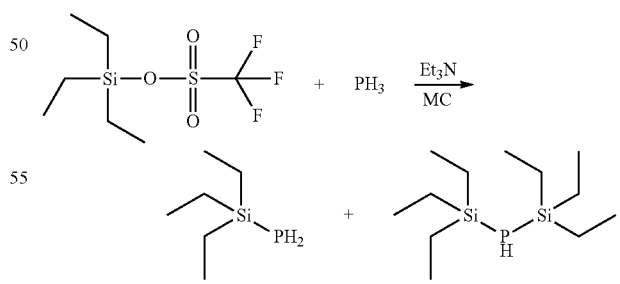

In a 2 L round-bottom three-neck flask of nitrogen atmosphere, at room temperature, 100 g of triethylsilyl triflate and 46 g of triethyl amine were added to 1 L of dichloromethane, and the mixture was stirred and mixed. While maintaining the temperature of the mixture at 25° C. or less, phosphine (PH$_3$) gas was introduced through a cannula at a speed of 3 ml/minute. When total 13.0 g of phosphine was introduced, the introduction of phosphine was stopped. The reactant thus obtained in the form of a mixture was vacuum distilled without filtration, thus obtaining 14.8 g of the title compound, (triethylsilyl)phosphine (yield: 27%).

MS (ESI): [M+H]$^+$ 148

$^1$H NMR (600 MHz, benzene-d$_6$): δ 0.93 (t, 9H), 0.64 (m, 6H)

$^{31}$P NMR (243 MHz, benzene-d$_6$): δ −260.6 (s)

Example 7: Synthesis of bis(triisopropylsilyl)phosphine, (i-Pr$_3$Si)$_2$PH

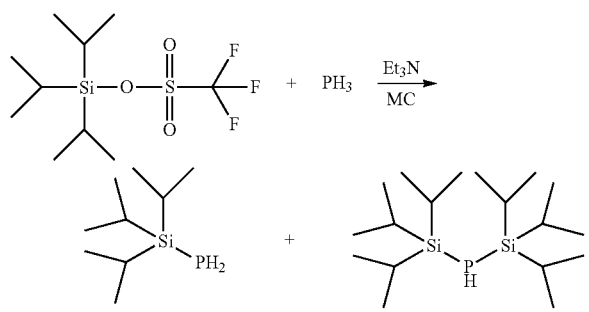

In a 2 L round-bottom three-neck flask of nitrogen atmosphere, at room temperature, 100 g of triisopropylsilyl triflate and 39.6 g of triethyl amine were added to 1 L of dichloromethane, and the mixture was stirred and mixed. While maintaining the temperature of the mixture at 25° C. or less, phosphine (PH$_3$) gas was introduced through a cannula at a speed of 3 ml/minute. When total 5.6 g of phosphine was introduced, the introduction of phosphine was stopped. The reactant thus obtained in the form of a mixture was vacuum distilled without filtration, thus obtaining 40.2 g of the title compound, bis(triisopropylsilyl)phosphine (yield: 71%).

MS (ESI): [M+H]$^+$ 346

$^1$H NMR (600 MHz, benzene-d$_6$): δ 1.18 (m, 42H)

$^{31}$P NMR (243 MHz, benzene-d$_6$): δ −286.3 (s)

Example 8: Synthesis of triisopropylsilylphosphine, (i-Pr$_3$Si)PH$_2$

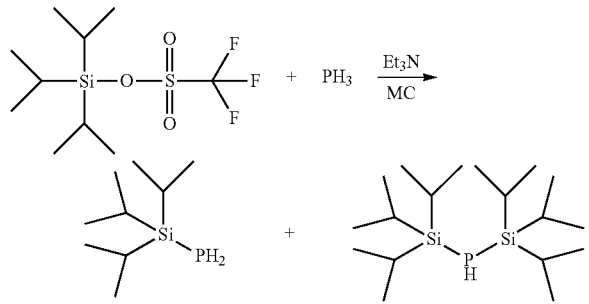

In a 2 L round-bottom three-neck flask of nitrogen atmosphere, at room temperature, 100 g of triisopropylsilyl triflate and 39.6 g of triethyl amine were added to 1 L of dichloromethane, and the mixture was stirred and mixed. While maintaining the temperature of the mixture at 25° C. or less, phosphine (PH$_3$) gas was introduced through a cannula at a speed of 3 ml/minute. When total 11.2 g of phosphine was introduced, the introduction of phosphine was stopped. The reactant thus obtained in the form of a mixture was vacuum distilled without filtration, thus obtaining 11.8 g of the title compound, (triisopropylsilyl)phosphine (yield: 19%).

MS (ESI): [M+H]$^+$ 190

$^1$H NMR (600 MHz, benzene-d$_6$): δ 0.88 (m, 21H)

$^{31}$P NMR (243 MHz, benzene-d$_6$): δ −273.8 (s)

Example 9: Synthesis of bis(dimethylisopropylsilyl)phosphine, (Me$_2$i-PrSi)$_2$PH

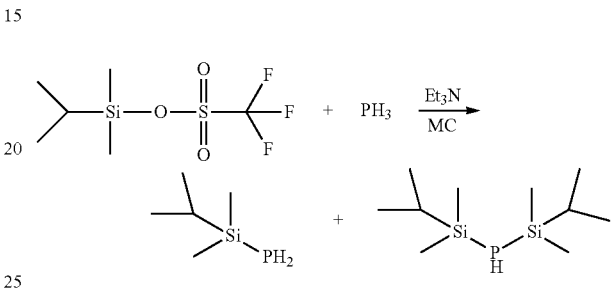

In a 2 L round-bottom three-neck flask of nitrogen atmosphere, at room temperature, 100 g of dimethylisopropylsilyl triflate and 48.5 g of triethyl amine were added to 1 L of dichloromethane, and the mixture was stirred and mixed. While maintaining the temperature of the mixture at 25° C. or less, phosphine (PH$_3$) gas was introduced through a cannula at a speed of 3 ml/minute. When total 6.8 g of phosphine was introduced, the introduction of phosphine was stopped. The reactant thus obtained in the form of a mixture was vacuum distilled without filtration, thus obtaining 34.2 g of the title compound, bis(dimethylisopropylsilyl)phosphine (yield: 73%).

MS (ESI): [M+H]$^+$ 234

$^1$H NMR (600 MHz, benzene-d$_6$): δ 1.01 (d, 12H), 0.93 (m, 2H), 0.19 (d, 12H)

$^{31}$P NMR (243 MHz, benzene-d$_6$): δ −255.2 (s)

Example 10: Synthesis of (triisopropylsilyl)(trimethyl silyl)phosphine, (i-Pr$_3$Si)(Me$_3$Si)PH

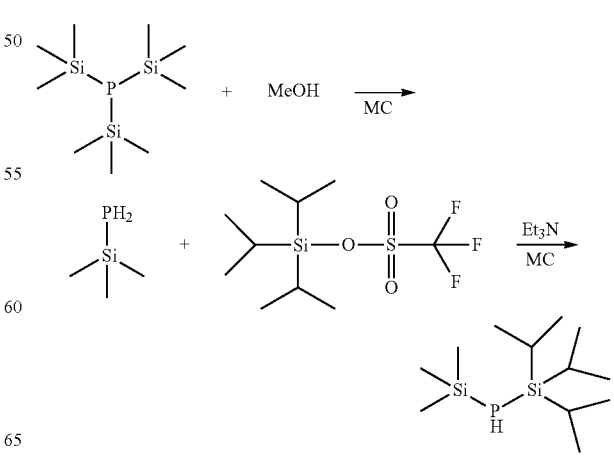

The mixture of (trimethylsilyl)phosphine in dichloromethane prepared in the step 2 of Example 4 was cooled to 0° C., and then, 12.1 g of triethyl amine and 38.0 g of triisopropylsilyl triflate were respectively added dropwise for 1 hour. The obtained reactant was vacuum distilled without filtration, thus obtaining 7.2 g of the title compound, (triisopropylsilyl)(trimethyl silyl)phosphine (yield: 23%).

MS (ESI): [M+H]$^+$ 262
$^1$H NMR (600 MHz, benzene-d$_6$): δ 1.05 (m, 21H), 0.23 (d, 9H)
$^{31}$P NMR (243 MHz, benzene-d$_6$): δ −261.8 (s)

Example 11: Synthesis of (dimethylisopropylsilyl)(trimethylsilyl)phosphine, (Me$_2$i-PrSi)(Me$_3$Si)PH

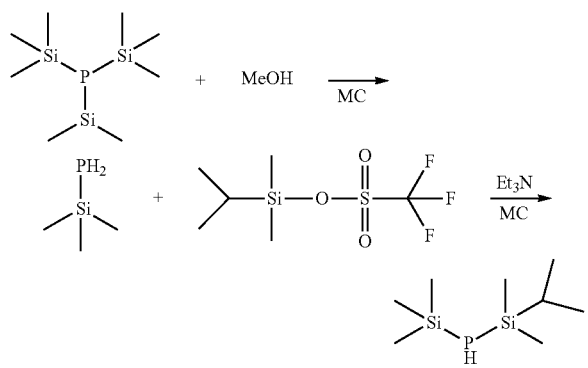

The mixture of (trimethylsilyl)phosphine in dichloromethane prepared in the step 2 of Example 4 was cooled to 0° C., and then, 12.1 g of triethyl amine and 31.1 g of dimethylisopropylsilyl triflate were respectively added dropwise for 1 hour. The obtained reactant was vacuum distilled without filtration, thus obtaining 4.0 g of the title compound, (dimethylisopropylsilyl)(trimethylsilyl)phosphine (yield: 16%).

MS (ESI): [M+H]$^+$ 206
$^1$H NMR (600 MHz, benzene-d$_6$): δ 1.10 (d, 6H), 0.93 (m, 1H), 0.25 (d, 9H), 0.19 (d, 6H)
$^{31}$P NMR (243 MHz, benzene-d$_6$): δ −247.2 (s)

Preparation Example of Quantum Dot

Example 12

To the mixed solution (1) of 70 mg (0.24 mmol) of indium acetate(In(Ac)$_3$), 183 mg (1 mmol) of zinc acetate (Zn (Ac)$_2$), 496 mg (2.17 mmol) of myristic acid (MA) and 4 ml of 1-octadecene (ODE) in a 25 ml three-neck flask, vacuum was applied and the mixed solution was heated to 110 r for 2 hours.

The mixed solution (1) was cooled to a room temperature. To the mixed solution (1) cooled to a room temperature, a solution of 15 mg of gallium chloride (GaCl$_3$) dissolved in 1 ml of 1-octadecene was added. And, continuously, a solution of 24 mg (0.095 mmol) of tris(trimethylsilyl)phosphine (TMSP) and 27.8 mg (0.095 mmol) of bis(tert-butyldimethylsilyl) phosphine obtained in Example 1, dissolved in 1 ml of 1-octadecene (ODE), was added to prepare a mixed solution (2).

The temperature of the mixed solution (2) was raised to 300° C., and then, it was heated to 300° C. for 10 minutes.

0.25 ml (1 mmol) of dodecanethiol (DDT) was added to the mixed solution (2), and then, the solution was cooled to a room temperature.

To the mixed solution (2) cooled to a room temperature, an excessive amount of a mixed solution of methanol and butanol was added to precipitate, and then, it was filtered and dried to obtain a quantum dot (hereinafter, referred to as an InP/GaP/ZnS quantum dot) comprising InP as a core and comprising ZnS and GaP as a shell.

Example 13

An InP/GaP/ZnS quantum dot was prepared by the same method as Example 12, except that 14 mg (0.095 mmol) of tert-butyldimethylsilyl phosphine obtained in Example 2 was used instead of bis(tert-butyldimethylsilyl)phsophine of Example 1 in Example 12.

Example 14

An InP/GaP/ZnS quantum dot was prepared by the same method as Example 12, except that 29 mg (0.095 mmol) of bis(dimethylphenylsilyl)phosphine obtained in Example 3 was used instead of bis(tert-butyldimethylsilyl)phsophine of Example 1 in Example 12.

Example 15

An InP/GaP/ZnS quantum dot was prepared by the same method as Example 12, except that 24 mg (0.095 mmol) of (tert-butyldimethylsilyl)(trimethylsilyl)phosphine obtained in Example 4 was used instead of bis(tert-butyldimethylsilyl)phsophine of Example 1 in Example 12.

Example 16

An InP/GaP/ZnS quantum dot was prepared by the same method as Example 12, except that 24 mg (0.095 mmol) of bis(triethylsilyl)phosphine obtained in Example 5 was used instead of bis(tert-butyldimethylsilyl)phsophine of Example 1 in Example 12.

Example 17

An InP/GaP/ZnS quantum dot was prepared by the same method as Example 12, except that 14 mg (0.095 mmol) of (triethylsilyl)phosphine obtained in Example 6 was used instead of bis(tert-butyldimethylsilyl)phsophine of Example 1 in Example 12.

Example 18

An InP/GaP/ZnS quantum dot was prepared by the same method as Example 12, except that 34 mg (0.095 mmol) of bis(triisopropylsilyl)phosphine obtained in Example 7 was used instead of bis(tert-butyldimethylsilyl)phsophine of Example 1 in Example 12.

Example 19

An InP/GaP/ZnS quantum dot was prepared by the same method as Example 12, except that 18 mg (0.095 mmol) of (triisopropylsilyl)phosphine obtained in Example 8 was used instead of bis(tert-butyldimethylsilyl)phsophine of Example 1 in Example 12.

Example 20

An InP/GaP/ZnS quantum dot was prepared by the same method as Example 12, except that 22 mg (0.095 mmol) of bis(dimethylisopropylsilyl)phosphine obtained in Example 9 was used instead of bis(tert-butyldimethylsilyl)phsophine of Example 1 in Example 12.

Example 21

An InP/GaP/ZnS quantum dot was prepared by the same method as Example 12, except that 25 mg (0.095 mmol) of (triisopropylsilyl)(trimethylsilyl)phosphine obtained in Example 10 was used instead of bis(tert-butyldimethylsilyl) phsophine of Example 1 in Example 12.

Example 22

An InP/GaP/ZnS quantum dot was prepared by the same method as Example 12, except that 20 mg (0.095 mmol) of (dimethylisopropylsilyl)(trimethylsilyl)phosphine obtained in Example 11 was used instead of bis(tert-butyldimethylsilyl)phsophine of Example 1 in Example 12.

Comparative Example 1

An InP/GaP/ZnS quantum dot was prepared by the same method as Example 12, except that bis(tert-butyldimethylsilyl)phosphine of Example 1 was not used, and 55.6 mg (0.19 mmol) of tris(trimethylsilyl)phosphine was used as a phosphine precursor.

EXPERIMENTAL EXAMPLE

Experimental Example 1: Evaluation of Optical Properties of InP/GaP/ZnS Quantum Dots In order to find out the optical properties of the quantum dots prepared in Examples and Comparative Examples, the optical properties of the InP/GaP/ZnS quantum dots prepared in Example 12 and Comparative Example 1 were measured using a fluorophotometer (device name: Perkin Emer-LS55), and the results were shown in the following Table 1.

The graph of light emission according to the wavelength of the quantum dots of Example 12 of the present invention and Comparative Example 1 were shown in FIG. 1.

Figure 2:
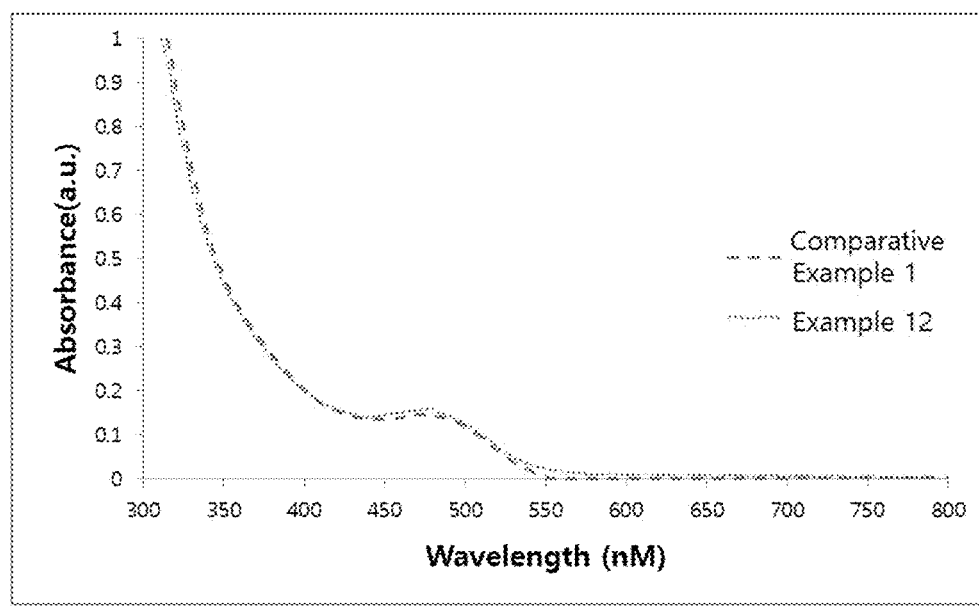
FIG. 2 is a graph showing the absorption properties of the quantum dots according to Examples and Comparative Examples.

And, the graph of light absorption according to the wavelength of the quantum dots of Example 12 of the present invention and Comparative Example 1 were shown in FIG. 2.

TABLE 1

| quantum dot | Phosphine precursor | FWHM (nm) |
|---|---|---|
| Example 12 | Example 1 and TMSP 1:1 mixture | 58 |
| Comparative Example 1 | TMSP | 62 |

The FWHM (full width at half maximum) in the Table 1 means that of light emission peak, and the smaller FWHM means that a quantum dot with a uniform size and high purity is prepared.

Comparative Example 1 prepared a quantum dot using only tris(trimethylsilylphosphine)(TMSP), which is a known phosphine precursor.

Comparing the FWHM of the quantum dot of Example 12 wherein bis(tert-butyldimethylsilyl)phosphine, which is the phosphine precursor of the present invention, and known material tris(trimethylsilylphosphine) are mixed at a mole ratio of 1:1 to prepare a quantum dot, with the FWHM of the quantum dot of Comparative Example 1, it is confirmed that FWHM decreased about 9%. Thus, it can be seen that if a quantum dot is prepared using the novel phosphine precursor of the present invention, a quantum dot with excellent properties, which has a uniform size and high purity, can be prepared.

What is claimed is:
1. A phosphine precursor composition for preparation of a quantum dot, comprising a phosphine precursor selected from the group consisting of the following Structural Formulas, and tris(trimethylsilyl)phosphine at a mole ratio of 1:1:

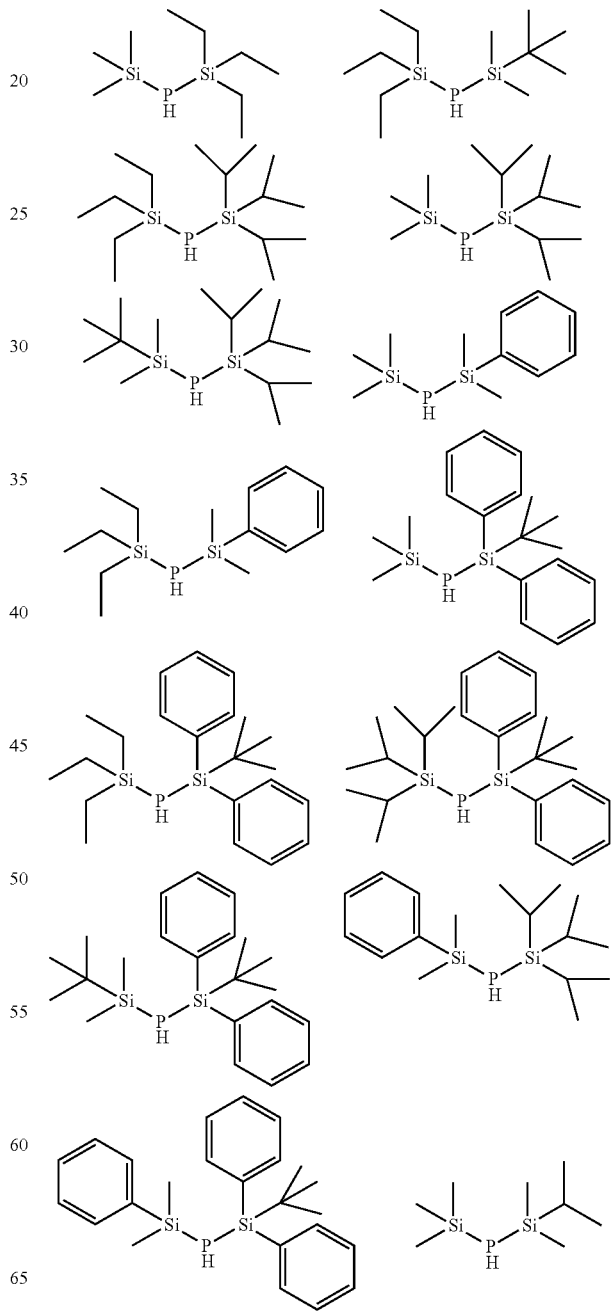

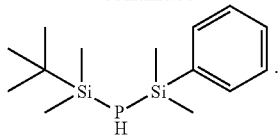

2. A method for preparing the phosphine precursor of claim 1, comprising the steps of:
preparing a mixture of a silyl triflate compound, halogenated hydrocarbon, and tertiary amine; and
adding phosphine to the mixture.

3. A method for preparing the phosphine precursor of claim 1, comprising the steps of:
preparing a mixture of a primary phosphine compound, halogenated hydrocarbon, and tertiary amine; and
adding a silyl triflate compound to the mixture.

4. The method for preparing the phosphine precursor according to claim 2, wherein the halogenated hydrocarbon is dichloromethane, and the tertiary amine is trimethylamine.

* * * * *